United States Patent
Blackwell et al.

(10) Patent No.: US 7,258,848 B1
(45) Date of Patent: Aug. 21, 2007

(54) PROCESS FOR SCRUBBING AMMONIA FROM ACID GASES COMPRISING AMMONIA AND HYDROGEN SULFIDE

(75) Inventors: Benny E. Blackwell, Newark, DE (US); Luis Alberto Chu, Landenberg, PA (US); Monroe Davis, Avondale, PA (US); Wayne B. Ely, West Chester, PA (US); Robert Joseph Flowers, Newark, DE (US); Steven Lamar Grise, Landenberg, PA (US); Zeru Berhane Tekie, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/496,385

(22) Filed: Jul. 31, 2006

(51) Int. Cl.
- *B01D 53/58* (2006.01)
- *C01B 17/04* (2006.01)
- *C01B 25/28* (2006.01)
- *C01C 1/18* (2006.01)
- *C01C 1/242* (2006.01)

(52) U.S. Cl. ............... 423/237; 423/238; 423/310; 423/313; 423/396; 423/549; 423/550; 423/573.1

(58) Field of Classification Search ............. 423/396, 423/310, 313, 549, 550, 573.1, 237, 238
See application file for complete search history.

(56) References Cited

U.S. PATENT DOCUMENTS

| 2,439,547 | A |   | 4/1948 | Otto |  |
|---|---|---|---|---|---|
| 3,369,869 | A | * | 2/1968 | Deiters | 423/352 |
| 4,324,776 | A | * | 4/1982 | Kim | 423/550 |
| 4,522,638 | A | * | 6/1985 | Karwat | 95/166 |
| 4,530,821 | A | * | 7/1985 | Diemer | 423/238 |
| 2003/0108469 | A1 |   | 6/2003 | Alix et al. |  |

FOREIGN PATENT DOCUMENTS

| DD | 130337 |   | 3/1978 |
|---|---|---|---|
| EP | 0 857 509 A1 | * | 8/1998 |
| EP | 1 318 105 |   | 6/2003 |
| EP | 1 067 093 B1 |   | 12/2004 |
| JP | 53087556 |   | 8/1978 |
| JP | 53112275 |   | 9/1978 |
| JP | 19985088477 A |   | 4/1995 |
| JP | 1998167720 A |   | 6/1998 |
| JP | 200301137 A |   | 10/2000 |
| JP | 2001137888 A |   | 5/2001 |

* cited by examiner

Primary Examiner—Timothy C. Vanoy (57) ABSTRACT

The present invention provides a process for removing ammonia as an aqueous salt solution from an acid gas comprising ammonia and hydrogen sulfide. A strong acid, such as sulfuric acid, is used as a scrubbing agent to convert ammonia to an ammonium salt. Control of pH and stripping in combination with reboiler or evaporators reduces hydrogen sulfide concentration. The ammonium salt is produced as an aqueous solution, which may crystallized to form a solid product. The ammonium salt solution or solid may be used as a fertilizer.

16 Claims, 3 Drawing Sheets

PROCESS FOR SCRUBBING AMMONIA FROM ACID GASES COMPRISING AMMONIA AND HYDROGEN SULFIDE

BACKGROUND OF THE INVENTION

Fluid streams comprising hydrogen sulfide and ammonia are produced in a number of industrial processes. For example, "sour water", which comprises hydrogen sulfide and ammonia, is generated in refinery processes through various water wash processes. Sour water is stripped with steam to remove hydrogen sulfide and ammonia, generating "sour water stripper gas" (SWS gas) that typically contains about equal amounts of ammonia, hydrogen sulfide and water, although may contain up to 50% by volume ammonia in addition to water vapor, hydrogen sulfide and trace hydrocarbons.

In most refineries the SWS gas is treated in a Claus sulfur recovery unit (SRU) in which ammonia is reduced to nitrogen and hydrogen. The potentially valuable fixed nitrogen content of SWS gas is not only lost in this process, but also the operation of a SRU is negatively affected by the presence of ammonia in the feed (i.e., SWS gas). The negative effects to a SRU include increased air demand in an oxidation step, need for higher furnace temperature, reduced unit capacity and higher salt formation.

Alternatively, SWS gas may be treated in spent acid recovery (SAR) plants with conventional furnace technology. In these processes, the ammonia in SWS gas is converted to nitrogen and $NO_X$. Thus, it is generally expected that the presence of ammonia will increase $NO_X$ generation and reduce capacity of a SAR plant.

Coke ovens also produce a fluid stream comprising hydrogen sulfide and ammonia as hot, "raw" coke oven gas. "Raw" coke oven gas may be conditioned through several steps to yield a gas that can be used as a clean fuel. "Raw" coke oven gas comprises ammonia, which, due to its corrosive nature, must be removed. Ammonia is typically removed by contacting the raw coke oven gas with sulfuric acid, yielding ammonium sulfate.

More modern processes for ammonia removal from coke oven gas include washing (scrubbing) with water into which ammonia, in addition to hydrogen sulfide and hydrogen cyanide, if present, dissolve, thus removing the contaminants from the coke oven gas. The resulting scrubbing solution is transferred to an ammonia still in which steam is used to strip the ammonia from the solution. Ammonia vapor from the still may be processed to form ammonium sulfate, i.e., by reacting with sulfuric acid. Ammonia vapor may alternatively be condensed to form a strong ammonia solution, incinerated, or catalytically converted to nitrogen and hydrogen, which are then recycled back into the coke oven gas. The incineration of the ammonia vapors is usually not an option in areas where environmental laws restrict the emission of $NO_X$.

Kresnyak et al., in EP 0 857 509 A1, disclose a process for scrubbing ammonia and hydrogen sulfide from a fluid acid stream, including recovering the ammonia as ammonium sulfate. Kresnyak et al. disclose treating the stream with sulfuric acid to remove hydrogen sulfide from the stream and convert ammonia present in the stream to ammonium sulfate. Kresnyak et al. suggest using an optional charcoal filter to remove residual hydrogen sulfide and hydrocarbons from the ammonium sulfate solution. Rigorous removal of the hydrogen sulfide from the ammonium sulfate stream by charcoal filtration to insure absence of any hydrogen sulfide odor in the ammonium sulfate product is expensive and challenging.

It is desirable to have a process to separate ammonia from fluid streams comprising hydrogen sulfide and ammonia in a useful form and to reduce residual hydrogen sulfide levels in the separated ammonia to below the odor threshold (less than about 0.1 mg/Mg). It is also desirable to minimize $NO_X$ generation from conventional SAR plants, increase capacity and reliability of existing SR and SAR plants, and eliminate premature salt formation from ammonia, carbon dioxide and hydrogen sulfide in SR units. The present invention provides such a process.

SUMMARY OF THE INVENTION

The present invention provides a process for treating acid gas comprising ammonia and hydrogen sulfide. An acid gas is contacted with a strong acid, such as sulfuric acid, phosphoric acid, nitric acid or combination thereof, to produce an aqueous solution of the corresponding ammonium salt. The aqueous solution is controlled at or below pH 7 in order to minimize solubility of hydrogen sulfide (gas) in the solution. A portion of the hydrogen sulfide in the acid gas is removed as a vapor component. The aqueous solution must be further treated to reduce the concentration of hydrogen sulfide to a desired level, preferably below regulatory exposure limits and more preferably below the odor threshold to provide a composition suitable for use, such as ammonium fertilizer.

More specifically, in one embodiment of this invention, there is a process for removing ammonia from an acid gas comprising ammonia and hydrogen sulfide comprising: (a) contacting the acid gas with a strong acid and with recycle solution at a pH less than 7, to produce a gas phase and an ammonium salt solution wherein recycle solution is a portion of the product ammonium salt solution; (b) separating the gas phase from the solution; (c) feeding the solution from step (b) to a stripper to remove hydrogen sulfide, water, and hydrocarbons, if present in said acid gas to provide a purified concentrated ammonium salt solution and a gas component, wherein heat and driving force to remove said hydrogen sulfide, water, and hydrocarbons is supplied to said stripper by a reboiler, which circulates purified concentrated ammonium salt solution; and (d) contacting the purified concentrated ammonium salt solution exiting the stripper with a base to provide an ammonium salt solution having a pH between 6 and 8.

In an alternative embodiment, the process of this invention comprises: (a) contacting the acid gas with a strong acid and with recycle solution at a pH less than 7, to produce a gas phase and an ammonium salt solution wherein recycle solution is a portion of the product ammonium salt solution; (b) separating the gas phase from the solution; (c) feeding the solution from step (b) to an evaporator, to provide a gas phase and a concentrated ammonium salt solution; (d) feeding the concentrated ammonium salt solution to a steam stripper to remove residual hydrogen sulfide, water and hydrocarbons, if present, wherein steam provides driving force to remove said hydrogen sulfide, water and hydrocarbons from said concentrated salt solution to provide a purified concentrated ammonium salt solution and a gas component; and (e) contacting the purified ammonium salt solution exiting the stripper with a base to provide an ammonium salt solution having a pH between 6 and 8.

In yet another embodiment of this invention the process comprises: (a) contacting the acid gas with a strong acid and with recycle solution at a pH less than 7, to produce a gas phase and an ammonium salt solution wherein recycle solution is a portion of the product ammonium salt solution; (b) separating the gas phase from the solution; (c) feeding the solution from step (b) to an evaporator, to provide a gas phase and a concentrated ammonium salt solution; feeding the concentrated ammonium salt solution to a gas stripper to remove residual hydrogen sulfide, water and hydrocarbons, if present, wherein carrier gas provides driving force to remove said hydrogen sulfide, water and hydrocarbons from said concentrated salt solution to provide a purified concentrated ammonium salt solution and a gas component; and (e) contacting the purified ammonium salt solution exiting the stripper with a base to provide an ammonium salt solution having a pH between 6 and 8.

The product ammonium salt solution is suitable for use as fertilizer in either solution form as produced or solid form wherein the process further comprises feeding the ammonium salt solution product to a crystallizer.

A process of this invention may further comprise feeding one or more gas phases produced, optionally after condensing, to a sulfur recovery unit or to a spent acid recovery unit.

DETAILED DESCRIPTION

The present invention comprises a process for the removal of ammonia as an aqueous salt solution from an acid gas comprising ammonia and hydrogen sulfide, such as refinery sour water stripper (SWS) gas, coke oven gas and other acid gases comprising ammonia and hydrogen sulfide. In this process, a strong acid, preferably an acid selected from the group consisting of sulfuric acid, phosphoric acid, nitric acid, and combination of one or more thereof, is used as a scrubbing agent. By reaction with acid, ammonia is converted to an ammonium salt. When sulfuric acid is used, ammonia is converted to ammonium sulfate, which is an environmentally friendly product that can be used as a fertilizer after further processing. As alternatives to sulfuric acid, phosphoric or nitric acid may be used to generate a fertilizer comprising phosphorus or additional nitrogen, respectively.

The process of the present invention is preferably linked with a sulfur recovery unit (SRU) or spent acid recovery (SAR) plant such that ammonia is removed from acid gas, such as sour water stripper gas before residual gas comprising hydrogen sulfide is fed to an incineration step in a sulfuric recovery unit or a spent acid recovery plant.

The aqueous ammonium sulfate solution may be used as liquid fertilizer, or subsequently evaporated, crystallized, separated by centrifugation or other solid-liquid separation method, and dried for use as solid fertilizer.

The process of the present invention minimizes $NO_X$ generation from conventional SAR furnaces in a refinery. Rather than feed acid gas comprising ammonia, such as SWS gas, to the furnace producing nitrogen and $NO_X$, as has been done heretofore, ammonia is removed from the acid gas and converted into a useful fertilizer. The process of the present invention also increases capacity and reliability of existing SAR plants by removing ammonia from the feed stream, which would otherwise consume reagents (e.g., oxygen) in the SAR plant. This process also increases capacity of sulfur recovery units (SRUs) and eliminates salt formation from ammonia, carbon dioxide and hydrogen sulfide in SRUs.

The practice of the present invention is described with reference to FIG. 1 (ammonium sulfate process with a reboiler driven stripper), FIG. 2 (ammonium sulfate process with steam stripping), and FIG. 3 (ammonium sulfate process with air stripping).

Figure 1:
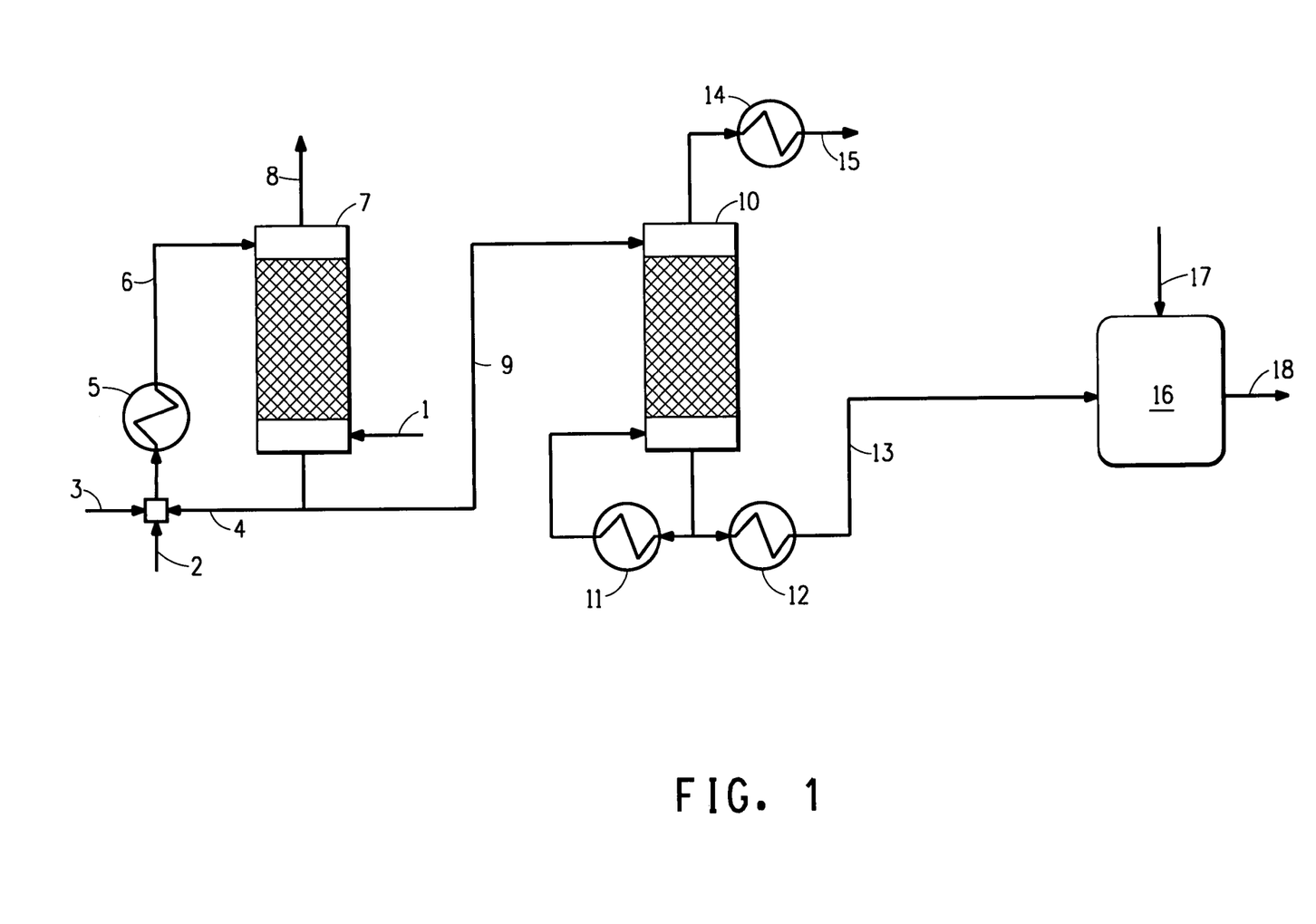
FIG. 1 is a process diagram of one embodiment of the process of this invention using a reboiler stripper.

In one embodiment of the present invention, according to FIG. 1, acid gas 1 is contacted with strong acid, which is comprised of recycle acid and/or water 2, fresh acid 3 and scrubber recycle 4 at a pH less than 7. More particularly, acid gas 1 is introduced to the bottom of scrubber 7 and contacted with strong acid, producing a gas phase and an ammonium salt solution. Acid gas 1 comprises ammonia, hydrogen sulfide and, depending on its source, may further comprise mercaptans and hydrocarbons. Acid gas 1 may be SWS gas, coke oven gas or other gas comprising ammonia and hydrogen sulfide. Recycle acid and/or water 2, fresh acid 3 and scrubber recycle 4, which is an aqueous solution comprising the ammonium salt of the acid fed as recycle acid and/or water 2 and fresh acid 3, are combined and cooled in recycle cooler 5. Cooled scrubber recycle acid stream 6 exits cooler 5.

The amount of acid needed from fresh acid 3, recycle acid and/or water 2 and scrubber recycle 4 may vary depending on the amount of ammonia in the acid gas.

In the practice of the present invention, the amounts of recycle acid and/or water 2 and fresh acid 3 may vary. If the concentration and available volume of recycle acid 2 is sufficient to achieve the desired product from scrubber 7, no fresh acid 3 may be needed. Conversely, if no source of recycle acid is available, then the stream of recycle acid or water 2 is a water stream, which is then combined with fresh acid 3.

No make up water 2 may be required if there is sufficient recycle acid of appropriate concentration is available to the system, such as effluent from spent acid recovery plant in a refinery. In most spent acid recovery plants, weak acid effluent is neutralized with caustic in the form of sodium hydroxide and discharged as wastewater. In the present invention, this weak acid can be used as a recycle acid and as a source of acid and water make up, reducing the wastewater generated in a refinery. Thus, the process of this invention is particularly advantageous to incorporate into a refinery to not only reduce volume of wastewater produced from spent acid, but also to recover ammonia in the form of valuable product fertilizer.

Cooled scrubber recycle acid stream 6 is fed to the top of scrubber 7. In scrubber 7, a gas phase, off-gas 8 is separated from the solution in scrubber 7, which becomes two streams, one of which is scrubber recycle 4, which is recycled to mix with recycle acid and/or water 2 and fresh acid 3. The second solution stream from scrubber 7 is stripper feed 9, which is fed to stripper 10.

Off-gas 8, comprising hydrogen sulfide from scrubber 7 can be processed in a sulfur recovery unit (SRU) furnace or a spent acid recovery (SAR) furnace, for example, in a refinery. Off-gas 8 generally comprises less than 1 mg/kg ammonia.

Removing part of product of scrubber 7 as scrubber recycle 4 enables heat to be removed from scrubber 7 to reduce loss of water in off-gas 8. While illustrated as part of the process for FIG. 1, removing a portion of the solution exiting scrubber 7 from stripper feed 9 as scrubber recycle 4 is an optional, but preferred step. Thus, when off-gas 8 is processed in a SRU furnace or a SAR furnace, less water and less ammonia are introduced thus, increasing the respective furnace capacity.

The stream exiting scrubber 7 bottom is split between scrubber recycle 4 and stripper feed 9, which is an aqueous solution comprising ammonium salt of acid stream 6, residual hydrogen sulfide, and hydrocarbons, if hydrocarbons are present in acid gas 1. The amounts of recycle acid and/or water 2 and fresh acid 3 added to scrubber 7 are preferably controlled such that the pH of stripper feed 9 is less than pH 7, more preferably in the range of pH 2 to 4. A pH of less than 7 at the bottom of scrubber 7 minimizes solubility of hydrogen sulfide in the ammonium salt solution to maximize ammonia removal.

The temperature of off-gas 8 is generally in the range of 40–90° C., that is, less than boiling point of water so that water is retained in the ammonium salt solution, which exits scrubber 7 and is split between scrubber recycle 4 and stripper feed 9, rather than in off-gas 8. The temperature of the stream, which becomes scrubber recycle 4 and stripper feed 9, is generally in the range of 45–100° C.

In the process of FIG. 1, stripper feed 9, which is an ammonium salt solution, comprising hydrogen sulfide, water, and hydrocarbons, if hydrocarbons are present in acid gas 1, is fed to stripper 10 to remove residual hydrogen sulfide, hydrocarbons and water to provide a purified concentrated ammonium salt solution and a gas component, wherein heat and driving force to remove said water, hydrogen sulfide, and hydrocarbons is supplied to stripper 10 by reboiler 11, which circulates purified concentrated ammonium salt solution from stripper 10 back to stripper 10. The purpose of stripper 10 is to remove light hydrocarbons remaining in ammonium salt solution of stripper feed 9 and also to remove hydrogen sulfide and mercaptans to desired concentrations.

More specifically, in the process of FIG. 1, stripper feed 9 is fed to the top of stripper 10. A portion of product exiting stripper 10 is heated and recirculated through reboiler 11 to the bottom of stripper 10. Reboiler 11 is operated such that the product exiting stripper 10, which is heated and recirculated through reboiler 11 back to stripper 10, provides sufficient heat and energy (driving force) to remove hydrocarbons and hydrogen sulfide from stripper feed 9 in order to achieve desired concentrations of hydrogen sulfide in product from stripper 10.

Generally the stripper is operated such that the temperature is about 5–10° C. above the boiling point of the liquid at stripper 10 top pressure. For example, at stripper top pressure of 1 atmosphere (1 atm, 101 kPa), the temperature may be about 106° C. Higher temperatures may be desirable if loads of water, hydrogen sulfide, mercaptans and other gases in acid gas 1 are high. However, temperature should not be so high to lose more water than is desired. Operation of stripper 10 under pressure as well as under vacuum are contemplated herein. Pressure may range from 5 mm Hg (667 Pa) to 15 psig (205 kPa). Conveniently, pressure is about 1 atm (101 kPa). Those skilled in the art will readily be able to determine, based on known factors such as, water concentration, gas concentrations, e.g., of hydrogen sulfide, mercaptans, hydrocarbons, and pressure, the appropriate temperature for stripper 10 bottom to remove water, hydrogen sulfide, mercaptans, hydrocarbons, and other gases from stripper feed 9. It will be well understood by those skilled in the art that lower temperatures can be used when operating under vacuum than at pressures of atmospheric or greater.

While a portion of the product exiting stripper 10 is used for stripping by recycle through reboiler 11, the remaining portion of product exiting stripper 10 is passed through product cooler 12 to provide neutralizer feed 13.

Concentrations of hydrogen sulfide and hydrocarbons in stripper feed 9 are reduced in stripper 10. The concentration of hydrogen sulfide in the liquid solution exiting stripper 10 is preferably less than regulatory exposure limits and more preferably below the odor threshold. The odor threshold varies by the individual and has been recited as low as 0.05 parts per billion (ppb) to as high as 20 ppb. This concentration of hydrogen sulfide is below regulatory exposure limits and further, is below the odor threshold. The hydrogen sulfide concentration in the solution exiting stripper 10 is preferably reduced such that the ammonium salt solution and ammonium salt (solids) produced therefrom as final products do not have any sulfide odor.

Gases exiting top of stripper 10 pass through stripper condenser 14 to provide condensate 15. Condensate 15, which comprises hydrogen sulfide, hydrocarbons (if present in acid gas 1), and water, may be fed to sour water storage (SWS) tank or to spent acid recovery (SAR) furnace in a refinery for further processing. SWS tank collects aqueous fluids which may be collected for use as feed to produce SWS gas, and thus recycled back to the process of this invention. In spent acid recovery, condensate 15 is incinerated in a furnace to produce sulfur dioxide, which is converted to sulfuric acid. Advantageously, the process of this invention may be integrated with spent acid recovery, such that the sulfuric acid produced in spent acid recovery can be used as the fresh acid 3 or recycle acid 2 for reaction with acid gas 1 in scrubber 7.

Neutralizer feed 13 is fed to neutralizer 16, which is pH controlled. Base 17, in the form of ammonia, ammonium hydroxide, potassium hydroxide or a combination thereof is fed under pH control to neutralizer 16 to contact neutralizer feed 13 and to adjust pH of feed 13 to a value between about pH 4 and about 11. Neutralizer 16 may comprise a single vessel or multiple vessels.

Multiple vessels, that is, a multistep adjustment of pH, are preferred for ease of process control. Preferably pH is adjusted to between pH 6 and 8, more preferably, about pH 7. Dilution water (not shown) may optionally be added to neutralizer 16 if desired to maintain the concentration of ammonium salt in the final product below the solubility limit, that is, so that the salt does not begin to precipitate from the solution. Product ammonium salt solution 18 may be further processed or stored for use without further processing as liquid fertilizer.

In an alternative embodiment to the present invention, an evaporator in combination with air or steam stripping are used in combination with or in place of the reboiler in the stripper of the first embodiment. The alternative embodiments will be described in combination with descriptions of FIGS. 2 and 3.

Figure 2:
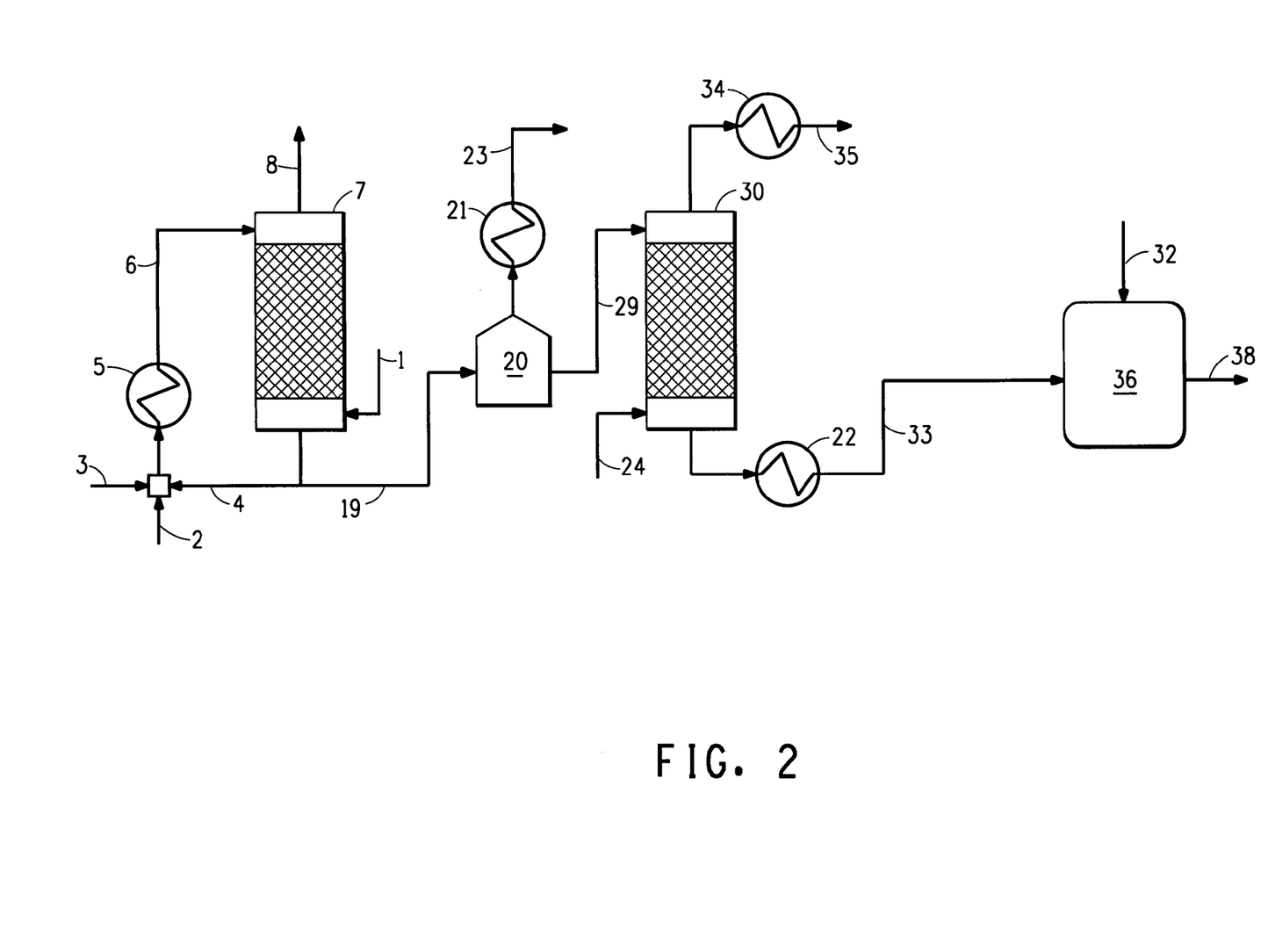
FIG. 2 is a process diagram of one embodiment of the process of this invention using steam stripping.

FIG. 2 illustrates a second embodiment of this invention in which evaporation and steam stripping replace the reboiler stripper of FIG. 1. In this process, acid gas 1 is contacted with strong acid, which is comprised of recycle acid and/or water 2, fresh acid 3, and scrubber recycle 4 at a pH less than 7. More particularly, acid gas 1 is treated in scrubber 7 with cooled scrubber recycle stream 6, produced by combining and cooling recycle acid and/or water 2, fresh acid 3 and scrubber recycle 4 in recycle cooler 5 as illustrated in FIG. 1, and discussed hereinabove, thus producing a gas phase and an ammonium salt solution. Acid gas 1, recycle acid and/or water 2, fresh acid 3 and scrubber recycle 4 are the same as described for FIG. 1.

In scrubber 7, the gas phase is separated from the ammonium salt solution providing off-gas 8. Off-gas 8, comprising hydrogen sulfide from scrubber 7 can be processed in a sulfur recovery unit (SRU) furnace or a spent acid recovery (SAR) furnace, for example, in a refinery. Off-gas 8 generally comprises less than 1 mg/kg ammonia.

Operation of scrubber 7 is conducted to produce a product stream, which is an aqueous solution comprising ammonium salt of acid 6, residual hydrogen sulfide, and hydrocarbons, if present in acid gas 1, preferably having a pH of less than 7, more preferably pH of 2 to 4 and a temperature in the range of 45–100° C. This stream is divided into scrubber recycle 4, which is contacted with recycle acid and/or water 2 and fresh acid 3, and cooled in recycle cooler 5. Remaining portion of product of scrubber 7, the ammonium salt solution, is provided as evaporator feed 19.

In the process as illustrated in FIG. 2, evaporator feed 19, which is an ammonium salt solution is fed to evaporator 20, wherein water, hydrogen sulfide, mercaptans and hydrocarbons are removed and concentration of the ammonium salt in the solution is increased, thus producing a gas phase and a concentrated ammonium salt solution.

Evaporator feed 19 is fed to evaporator 20. Evaporator 20 generally operates under vacuum. Evaporator 20 may be operated at pressures ranging from 5 mm Hg (667 Pa) to 15 psig (205 kPa). Less heat (lower temperature) is required when operating at lower vacuum. In evaporator 20, ammonium salt solution of feed 19 is concentrated by evaporating water, non-condensables and acid gases such as hydrogen sulfide to remove the water and gases from the salt solution and producing concentrated ammonium salt solution 29. Gases from evaporator 20 are passed through evaporator condenser 21 to provide evaporator condensate 23, which is an aqueous liquid comprising hydrogen sulfide.

The process of FIG. 2 further comprises feeding concentrated ammonium salt solution 29 to steam stripper 30 wherein steam provides the driving force for removing hydrogen sulfide, and mercaptans and hydrocarbons, if present from the solution to a desired concentration to provide a purified concentrated ammonium salt solution and a gas component.

More particularly, according to FIG. 2, concentrated ammonium salt solution 29 from evaporator 20 is fed to the top of steam stripper 30. Steam 24 is fed to the bottom of stripper 30, which results in reduced concentration of hydrogen sulfide from solution 29, preferably to below the odor threshold.

Gas component exiting top of stripper 30 pass through stripper condenser 34 to provide stripper condensate 35, which is an aqueous liquid comprising hydrogen sulfide. Condensate 35 or condensate 35 combined with condensate 23 and may be fed to sour water storage or to spent acid recovery furnace in a refinery for further processing as discussed for condensate 15 for FIG. 1. As previously stated, it is advantageous to integrate the process of this invention and condensate products with a spent acid recovery (SAR) plant wherein hydrogen sulfide is converted to sulfuric acid.

Purified concentrated ammonium salt solution, product exiting stripper 30, is passed through cooler 22 to provide neutralizer feed 33 to neutralizer 36. Neutralizer feed 33, purified concentrated ammonium salt solution, is fed to neutralizer 36, wherein the solution is contacted with base 37 to provide an ammonium salt solution having a pH between 6 and 8. Base 37, in the form of ammonia, ammonium hydroxide, potassium hydroxide or a combination thereof is fed under pH control to neutralizer 36 to adjust pH of feed 33 to a value between about pH 4 and about 11. Neutralizer 36 may comprise a single vessel or multiple vessels. Multiple vessels, that is, a multistep adjustment of pH, are preferred for ease of process control. Preferably pH is adjusted to between pH 6 and 8, more preferably, about pH 7. Dilution water may optionally be added to neutralizer 36 if desired to maintain the concentration of ammonium salt in the final product below the solubility limit, that is, so that the salt does not begin to precipitate from the solution. Product ammonium salt solution 38 may be further processed or stored for use without further processing as liquid fertilizer.

Figure 3:
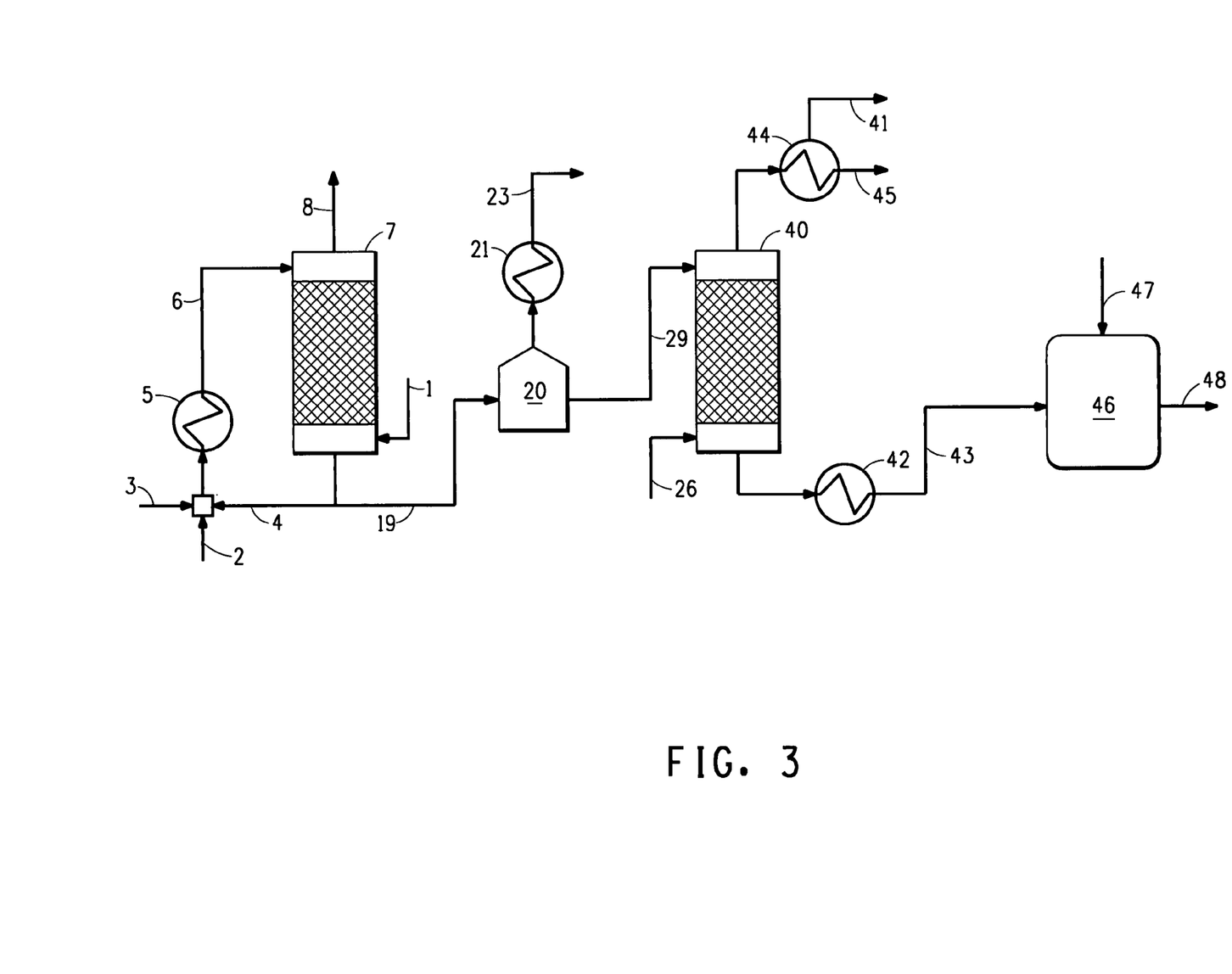
FIG. 3 is a process diagram of one embodiment of the process of this invention using gas (air) stripping.

FIG. 3 illustrates a third embodiment of this invention in which gas stripping replaces steam stripping of FIG. 2. In this process, acid gas 1 contacted with strong acid, which is comprised of recycle acid and/or water 2, fresh acid 3, and scrubber recycle 4 at a pH less than 7. More particularly, acid gas 1 is treated in scrubber 7 with cooled scrubber recycle stream 6, produced by combining and cooling recycle acid or water 2, fresh acid 3 and scrubber recycle 4 in recycle cooler 5 as in FIGS. 1 and 2, thus producing a gas phase and an ammonium salt solution.

In scrubber 7, the gas phase is separated from the ammonium salt solution providing off-gas 8. Off-gas 8, comprising hydrogen sulfide from scrubber 7 can be processed in a sulfur recovery unit (SRU) furnace or a spent acid recovery (SAR) furnace, for example, in a refinery. Off-gas 8 generally comprises less than 1 mg/kg ammonia.

Operation of scrubber 7 is conducted to produce a product stream, which is an aqueous solution comprising ammonium salt of acid 6, residual hydrogen sulfide, and hydrocarbons, if present in acid gas 1, preferably having a pH of less than 7, more preferably pH of 2 to 4 and a temperature in the range of 45–100° C. This stream is divided into scrubber recycle 4, which is contacted with recycle acid and/or water 2 and fresh acid 3, and cooled in recycle cooler 5. Remaining portion of product of scrubber 7, the ammonium salt solution, is provided as evaporator feed 19.

In the process as illustrated in FIG. 3, evaporator feed 19, which is an ammonium salt solution is fed to evaporator 20, wherein water, hydrogen sulfide, mercaptans, and hydrocarbons are removed and concentration of the ammonium salt in the solution is increased, thus producing a gas phase and a concentrated ammonium salt solution.

Evaporator feed 19 is fed to evaporator 20. Evaporator 20 generally operates under vacuum. Evaporator 20 may be operated at pressures ranging from 5 mm Hg (667 Pa) to 15 psig (205 kPa). Less heat (lower temperature) is required when operating at lower vacuum. In evaporator 20, ammonium salt solution of feed 19 is concentrated by evaporating water, non-condensables and acid gases such as hydrogen sulfide to remove the water and gases from the salt solution and producing concentrated ammonium salt solution 29. Gases from evaporator 20 are passed through evaporator condenser 21 to provide evaporator condensate 23, which is an aqueous liquid comprising hydrogen sulfide.

The process of FIG. 3 further comprises feeding concentrated ammonium salt solution 29 to gas stripper 40 wherein a carrier gas provides the driving force for removing hydrogen sulfide, and mercaptans and hydrocarbons, if present from the solution to a desired concentration, to provide a purified concentrated ammonium salt solution and a gas component. The carrier gas is typically air or other gas, such as nitrogen, which does not negatively impact the process.

More particularly, according to FIG. 3, concentrated ammonium salt solution 29 from evaporator 20 is fed to the top of gas stripper 40. Gas 26 is fed to the bottom of stripper 40, which results in reduced concentration of hydrogen sulfide from solution 29, preferably to below the odor threshold.

Gas component exiting top of stripper 40 pass through stripper condenser 44 to provide stripper condensate 45, which is an aqueous liquid comprising hydrogen sulfide. Condenser off-gas 41 comprises hydrogen sulfide and carrier gas of gas stripper. Condenser off-gas 41 may be fed to a sulfur recovery unit (SRU) furnace to produce elemental sulfur via the Claus process or a spent acid recovery (SAR) plant to produce sulfuric acid.

Condensate 45 or condensate 45 combined with condensate 23 and may be fed to sour water storage or to spent acid recovery furnace in a refinery for further processing as discussed for condensate 35 in FIG. 2. These condensates may be fed to sour water storage (SWS) tank or spent acid recovery furnace as discussed for condensate 15 for FIG. 1. It is advantageous to integrate the process of this invention and condensate products with a sulfur recovery unit (SRU) wherein hydrogen sulfide is converted to elemental sulfur or in a spent acid recovery (SAR) plant wherein hydrogen sulfide is converted to sulfuric acid.

Purified concentrated ammonium salt solution, product exiting stripper 40, is passed through cooler 42 to provide neutralizer feed 43 to neutralizer 46. Neutralizer feed 43, purified concentrated ammonium salt solution, is fed to neutralizer 46, wherein the solution is contacted with base 47 to provide an ammonium salt solution having a pH between 6 and 8. Base 47, in the form of ammonia, ammonium hydroxide, potassium hydroxide or a combination thereof is fed under pH control to neutralizer 46 to adjust pH of feed 43 to a value between about pH 4 and about 11. Neutralizer 46 may comprise a single vessel or multiple vessels. Multiple vessels, that is, a multistep adjustment of pH, are preferred for ease of process control. Preferably pH is adjusted to between pH 6 and 8, more preferably, about pH 7. Dilution water may optionally be added to neutralizer 46 if desired to maintain the concentration of ammonium salt in the final product below the solubility limit, that is, so that the salt does not begin to precipitate from the solution. Product ammonium salt solution 48 may be further processed or stored for use without further processing as liquid fertilizer.

If the production of a dry crystalline product is desired, crystallization may be performed as an additional separate step on product ammonium salt solution 18, 38, and 48, from the processes described in FIGS. 1, 2 and 3, respectively.

Alternatively, a fourth embodiment of this invention is provided comprising contacting an acid gas comprising ammonia and hydrogen sulfide with a strong acid, selected from the group consisting of sulfuric acid, phosphoric acid and nitric acid and with recycle solution at a pH less than 7, to produce a gas phase and an ammonium salt solution, wherein recycle solution is a portion of the product ammonium salt solution; crystallizing the ammonium salt solution in an evaporative crystallizer, wherein impurities in the solution are removed to provide a solid ammonium salt having a desirable concentration of hydrogen sulfide, preferably below regulatory exposure limits and more preferably below the odor threshold. In this embodiment of the present invention, the reboiler driven stripper of the first embodiment (as illustrated in FIG. 1) and the combination evaporator and stripper of the second and third embodiments (as illustrated in FIGS. 2 and 3) are replaced by an evaporative crystallizer. Evaporative crystallization effectively removes impurities from the product stream. The process of this embodiment optionally further comprises adjusting pH of the ammonium salt solution to a pH of 6 to 8, preferably a pH of about 7.

The process of the present invention provides a product, which is an ammonium salt solution, optionally also comprising one or more of potassium, phosphate and nitrate, in which the residual hydrogen sulfide concentration is substantially reduced, preferably below regulatory exposure limits and more preferably below the odor threshold level. Optionally, the ammonium salt solution is crystallized to provide a solid ammonium salt product.

Surprisingly, the use of a reboiler driven stripper, a steam stripper or a gas stripper significantly reduces the concentration of hydrogen sulfide and hydrocarbons in the ammonium salt solution product to desired concentrations. The stripping step advantageously eliminates the difficult and costly steps involved in using filters, such as charcoal filters or polishing filters to reduce concentrations of hydrogen sulfide and hydrocarbons when present in acid gases.

The process of this invention also provides flexibility in the composition of the product ammonium salt. Depending on which strong acid is used, the ammonium salt may comprise sulfate, phosphate, nitrate or a mixture of these. For example, it may be desirable to have phosphorus present in a fertilizer, thus phosphoric acid or a mixture of phosphoric acid with another acid may be the strong acid of choice. Furthermore, it may be desirable to incorporate potassium ions in the ammonium salt product. Thus, the base of choice may be potassium hydroxide or a mixture of potassium and ammonium hydroxides. If high nitrogen content is desired, nitric acid as the strong acid and/or ammonia or ammonium hydroxide as the base, may be preferred.

EXAMPLES

The processes shown in FIGS. 1, 2, and 3 were simulated in Examples 1, 2, and 3 using the OLI Systems Environmental Simulation Program (ESP) aqueous simulation module. In addition a comparative process based on the process disclosed by Kresnyak et al. in EP 0 857 509 A1 was simulated in Comparative Example. Information on the OLI Systems ESP is available from OLI Systems, Inc., Morris Plains N.J. The OLI Systems ESP aqueous simulation module is widely used to evaluate engineering concepts, and its use is well known to those skilled in the art.

Example 1

A computer modeling simulation of the process described in FIG. 1 was performed. Recycle acid effluent (weak acid comprising 5 wt % sulfuric acid) and fresh acid (98 wt % sulfuric acid) are used to scrub ammonia from 143.3 lb mol/h (65 kg mol/h) sour water stripper gas comprising 38.6 vol % ammonia, equivalent to a 0.28 mass fraction. Stream summaries and concentrations throughout the simulation for this example are shown in Table 1 below.

Example 2

A computer modeling simulation of the process described in FIG. 2 was performed. Recycle acid effluent (weak acid comprising 5 wt % sulfuric acid) and fresh acid (98 wt % sulfuric acid) are used to scrub ammonia from 143.3 lb mol/h (65 kg mol/h) sour water stripper gas comprising 38.6 vol % ammonia, equivalent to a 0.28 mass fraction. Stream summaries and concentrations throughout the simulation for this example are shown in Table 2 below.

Example 3

A computer modeling simulation of the process described in FIG. 3 was performed. Recycle acid effluent (weak acid comprising 5 wt % sulfuric acid) and fresh acid (98 wt % sulfuric acid) are used to scrub ammonia from 143.3 lb mol/h (65 kg mol/h) sour water stripper gas comprising 38.6 vol % ammonia, equivalent to a 0.28 mass fraction. Stream summaries and concentrations throughout the simulation for this example are shown in Table 3 below.

Comparative Example

A computer modeling simulation of a process based on the process disclosed by Kresnyak et al. in EP 0 857 509 A1 was performed. In this example, 40 wt % make up sulfuric acid is used to scrub ammonia from 4.1 lb mol/h (1.87 kg mol/h) sour water stripper gas that contains 37 Vol % ammonia, equivalent to a 0.26 mass fraction. Stream summaries and concentrations throughout the simulation for this example are shown in Table 4 below.

TABLE 1A

Stream Summary of the Process Described in FIG. 1 (Reboiler Driven Stripper).

| Conditions | Sour Water Stripper Gas 1 | Recycle Acid 2 | Fresh Acid 3 | Scrubber Recycle 4 | Scrubber Off Gas 8 | Stripper Feed 9 | Neutralizer Feed 13 | Product 18 |
|---|---|---|---|---|---|---|---|---|
| Mass Flow Rate, kg/h | 1529 | 4681 | 1010 | 50667 | 850 | 6370 | 4014 | 4016 |
| Mole Flow Rate, kg mol/h | 65 | 252 | 11 | 2334 | 26 | 294 | 165 | 165 |
| Temperature, °C. | 85 | 25 | 30 | 68 | 51 | 68 | 35 | 25 |
| Pressure, kPa | 163 | 138 | 310 | 122 | 122 | 122 | 101 | 101 |
| pH | — | 0.3 | — | 3.5 | — | 3.5 | 2.8 | 7.0 |

TABLE 1B

Product Composition of the Process Described in FIG. 1 (Reboiler Driven Stripper).

| Chemical Species | Mass Fraction | | | | | | | |
|---|---|---|---|---|---|---|---|---|
| Water | 0.19 | 0.95 | 0.02 | 0.74 | 0.05 | 0.74 | 0.59 | 0.59 |
| Sulfuric Acid | 0.00 | 0.05 | 0.98 | 0.00 | 0.00 | 0.00 | 0.00 | 0.00 |
| Ammonia | 0.28 | 0.00 | 0.00 | $4.6 \times 10^{-7}$ | $3.2 \times 10^{-9}$ | $4.6 \times 10^{-7}$ | $1.4 \times 10^{-8}$ | $1.0 \times 10^{-4}$ |
| Hydrogen Sulfide | 0.43 | 0.00 | 0.00 | $1.1 \times 10^{-3}$ | 0.77 | $1.1 \times 10^{-3}$ | $4.1 \times 10^{-13}$ | $3.3 \times 10^{-13}$ |
| Nitrogen | 0.04 | 0.00 | 0.00 | 0.00 | 0.07 | 0.00 | 0.00 | 0.00 |
| Carbon Dioxide | 0.05 | 0.00 | 0.00 | 0.00 | 0.09 | 0.00 | 0.00 | 0.00 |
| Ammonium Sulfate | 0.00 | 0.00 | 0.00 | 0.26 | 0.00 | 0.26 | 0.41 | 0.41 |
| Mercaptans | 0.01 | 0.00 | 0.00 | $1.24 \times 10^{-4}$ | 0.02 | $1.24 \times 10^{-4}$ | $3.92 \times 10^{-11}$ | $3.91 \times 10^{-11}$ |

* Bold numbers in column headings indicate streams or locations in FIG. 1

TABLE 2A

Stream Summary of the Process Described in FIG. 2 (Steam Stripping).

| Conditions | Sour Water Stripper Gas 1 | Recycle Acid 2 | Fresh Acid 3 | Scrubber Recycle 4 | Scrubber Off Gas 8 | Evaporator Feed 19 | Stripper Feed 29 | Steam 24 | Neutralizer Feed 33 | Product 38 |
|---|---|---|---|---|---|---|---|---|---|---|
| Mass Flow Rate, kg/h | 1529 | 4681 | 1010 | 50667 | 850 | 6370 | 4016 | 454 | 4044 | 4046 |
| Mole Flow Rate, kg mol/h | 65 | 252 | 11 | 2334 | 26 | 294 | 164 | 25 | 166 | 166 |
| Temperature, °C. | 85 | 25 | 30 | 68 | 51 | 68 | 99 | 127 | 107 | 25 |
| Pressure, kPa | 163 | 138 | 310 | 122 | 122 | 122 | 81 | 241 | 103 | 103 |
| pH | — | 0.3 | — | 3.5 | — | 3.5 | 3.6 | — | 3.6 | 7.0 |

TABLE 2B

Product Composition of the Process Described in FIG 2. (Steam Stripping).

| Chemical Species | Mass Fraction | | | | | | | | | |
|---|---|---|---|---|---|---|---|---|---|---|
| Water | 0.19 | 0.95 | 0.02 | 0.74 | 0.05 | 0.74 | 0.59 | 1.00 | 0.59 | 0.59 |
| Sulfuric Acid | 0.00 | 0.05 | 0.98 | 0.00 | 0.00 | 0.00 | 0.00 | 0.00 | 0.00 | 0.00 |
| Ammonia | 0.28 | 0.00 | 0.00 | $4.6 \times 10^{-7}$ | $3.2 \times 10^{-9}$ | $4.6 \times 10^{-7}$ | $2.6 \times 10^{-6}$ | 0.00 | $4.0 \times 10^{-6}$ | $1.0 \times 10^{-4}$ |
| Hydrogen Sulfide | 0.43 | 0.00 | 0.00 | $1.1 \times 10^{-3}$ | 0.77 | $1.1 \times 10^{-3}$ | $4.7 \times 10^{-7}$ | 0.00 | $1.5 \times 10^{-13}$ | $1.2 \times 10^{-13}$ |
| Nitrogen | 0.04 | 0.00 | 0.00 | 0.00 | 0.07 | 0.00 | 0.00 | 0.00 | 0.00 | 0.00 |
| Carbon Dioxide | 0.05 | 0.00 | 0.00 | 0.00 | 0.09 | 0.00 | 0.00 | 0.00 | 0.00 | 0.00 |
| Ammonium Sulfate | 0.00 | 0.00 | 0.00 | 0.26 | 0.00 | 0.26 | 0.41 | 0.00 | 0.41 | 0.41 |
| Mercaptans | 0.01 | 0.00 | 0.00 | $1.24 \times 10^{-4}$ | 0.02 | $1.24 \times 10^{-4}$ | $4.64 \times 10^{-7}$ | 0.00 | $1.43 \times 10^{-12}$ | $1.43 \times 10^{-12}$ |

* Bold numbers in column headings indicate streams or locations in FIG. 2

TABLE 3A

Stream Summary of the Process Described in FIG. 3 (Air Stripping).

| Conditions | Sour Water Stripper Gas 1 | Recycle Acid 2 | Fresh Acid 3 | Scrubber Recycle 4 | Scrubber Off Gas 8 | Evaporator Feed 19 | Stripper Feed 29 | Air 26 | Neutralizer Feed 43 | Product 48 |
|---|---|---|---|---|---|---|---|---|---|---|
| Mass Flow Rate, kg/h | 1529 | 4681 | 1010 | 50667 | 850 | 6370 | 4148 | 196 | 4019 | 4020 |
| Mole Flow Rate, kg mol/h | 65 | 252 | 11 | 2334 | 26 | 293 | 171 | 7 | 165 | 165 |
| Temperature, °C. | 85 | 25 | 30 | 68 | 51 | 68 | 99 | 25 | 71 | 25 |
| Pressure, kPa | 163 | 138 | 310 | 122 | 122 | 122 | 81 | 103 | 103 | 103 |
| pH | — | 0.3 | — | 3.5 | — | 3.5 | 3.6 | — | 3.3 | 7.0 |

TABLE 3B

Product Composition of the Process Described in FIG. 3 (Air Stripping).

| Chemical Species | Mass Fraction | | | | | | | | | |
|---|---|---|---|---|---|---|---|---|---|---|
| Water | 0.19 | 0.95 | 0.02 | 0.74 | 0.05 | 0.74 | 0.60 | 0.01 | 0.59 | 0.59 |
| Sulfuric Acid | 0.00 | 0.05 | 0.98 | 0.00 | 0.00 | 0.00 | 0.00 | 0.00 | 0.00 | 0.00 |
| Ammonia | 0.28 | 0.00 | 0.00 | $4.6 \times 10^{-7}$ | $3.2 \times 10^{-9}$ | $4.6 \times 10^{-7}$ | $2.7 \times 10^{-6}$ | 0.00 | $3.0 \times 10^{-7}$ | $1.02 \times 10^{-4}$ |
| Hydrogen Sulfide | 0.43 | 0.00 | 0.00 | $1.1 \times 10^{-3}$ | $7.7 \times 10^{-1}$ | $1.1 \times 10^{-3}$ | $5.3 \times 10^{-7}$ | 0.00 | $3.3 \times 10^{-13}$ | $2.7 \times 10^{-13}$ |
| Nitrogen | 0.04 | 0.00 | 0.00 | 0.00 | 0.07 | 0.00 | 0.00 | 0.78 | 0.00 | 0.00 |
| Oxygen | 0.00 | 0.00 | 0.00 | 0.00 | 0.00 | 0.00 | 0.00 | 0.21 | 0.00 | 0.00 |
| Carbon Dioxide | 0.05 | 0.00 | 0.00 | 0.00 | 0.09 | 0.00 | 0.00 | 0.00 | 0.00 | 0.00 |
| Ammonium Sulfate | 0.00 | 0.00 | 0.00 | 0.26 | 0.00 | 0.26 | 0.40 | 0.00 | 0.41 | 0.41 |
| Mercaptans | 0.01 | 0.00 | 0.00 | $1.24 \times 10^{-4}$ | 0.02 | $1.24 \times 10^{-4}$ | $5.29 \times 10^{-4}$ | 0.00 | $5.71 \times 10^{-11}$ | $5.70 \times 10^{-11}$ |

* Bold numbers in column headings indicate streams or locations in FIG. 3

TABLE 4A

Stream Summary of Comparative Process.

| Conditions | Sour Water Stripper Gas | Make Up Acid | Scrubber Recycle | Scrubber Off Gas | Aqueous Scrubber Product |
|---|---|---|---|---|---|
| Mass Flow Rate, kg/h | 45.4 | 91 | 1782 | 26.8 | 109 |
| Mole Flow Rate, kg mol/h | 1.87 | 4.1 | 71 | 0.92 | 4.5 |
| Temperature, °C. | 87 | 25 | 62 | 43 | 62 |
| Pressure, kPa | 207 | 138 | 129 | 122 | 129 |
| pH | — | — | 1.8 | — | 1.8 |

TABLE 4B

Product Composition of Comparative Process

| Chemical Species | Mass Fraction | | | | |
|---|---|---|---|---|---|
| Water | 0.16 | 0.60 | 0.56 | 0.03 | 0.56 |
| Sulfuric Acid | 0.00 | 0.40 | 0.00 | 0.00 | 0.00 |
| Ammonia | 0.26 | 0.00 | $6.0 \times 10^{-9}$ | $1.6 \times 10^{-9}$ | $6.0 \times 10^{-9}$ |
| Hydrogen Sulfide | 0.58 | 0.00 | $1.8 \times 10^{-3}$ | 0.97 | $1.8 \times 10^{-3}$ |
| Nitrogen | 0.00 | 0.00 | 0.00 | 0.00 | 0.00 |
| Oxygen | 0.00 | 0.00 | 0.00 | 0.00 | 0.00 |
| Carbon Dioxide | 0.00 | 0.00 | 0.00 | 0.00 | 0.00 |
| Ammonium Sulfate | 0.00 | 0.00 | 0.44 | 0.00 | 0.44 |
| Mercaptans | 0.00 | 0.00 | 0.00 | 0.00 | 0.00 |

Tables 1, 2 and 3 show the results of a simulation using the OLI Systems ESP aqueous simulation module. The Tables show the ammonia in the SWS gas (acid gas) 1 is reduced to below 1 mg/kg as shown by the Scrubber Off-Gas stream 8. A 41 wt % ammonium sulfate aqueous solution product was produced for each of Examples 1, 2, and 3, as Products 18, 38, and 48, for Tables 1, 2, and 3, respectively.

The ammonium sulfate solutions produced have ammonia concentrations in the range of about $1 \times 10^{-4}$ mass fraction, corresponding to 100 mg/kg (100 parts per million, ppm, by weight). The hydrogen sulfide concentrations in the ammonium sulfate solution products are in the mass fraction range of $1.2 \times 10^{-13}$ to $3.3 \times 10^{-13}$, corresponding to 0.12 to 0.33 microg/Mg (0.12–0.33 parts per trillion by weight). In a closed container, such hydrogen sulfide concentrations are in equilibrium with headspace below the odor threshold and far below all regulatory exposure limits.

Table 4 shows the result of a simulation using the OLI Systems ESP aqueous simulation module with feed streams based on the Comparative Example. The result shows that the residual hydrogen sulfide concentration in scrubber aqueous product (feed stream to carbon filter) is estimated to be 1800 mg/kg (ppm), above both odor threshold and regulatory exposure limits. Although additional filters may lower this concentration, significant costs in equipment and time will be needed to achieve the low concentrations of hydrogen sulfide in the products of Examples 1–3.

What is claimed is:

1. A process for removing ammonia from an acid gas comprising ammonia and hydrogen sulfide comprising:
    (a) contacting the acid gas with a strong acid, selected from the group consisting of sulfuric acid, phosphoric acid and nitric acid and with recycle solution at a pH less than 7, wherein recycle solution is a portion of the product ammonium salt solution, to produce a gas phase and an ammonium salt solution;
    (b) separating the gas phase from the solution;
    (c) feeding the solution from step (b) to a stripper to remove hydrogen sulfide, water, and hydrocarbons, if present in said acid gas to provide a purified concentrated ammonium salt solution and a gas component, wherein heat and driving force to remove said hydrogen sulfide, water, and hydrocarbons is supplied to said stripper by a reboiler, which circulates purified concentrated ammonium salt solution; and (d) contacting the purified ammonium salt solution exiting the stripper with a base to provide an ammonium salt solution having a pH between 6 and 8.

2. A process for removing ammonia from an acid gas comprising ammonia and hydrogen sulfide comprising:
  (a) contacting the acid gas with a strong acid, selected from the group consisting of sulfuric acid, phosphoric acid and nitric acid and with recycle solution at a pH less than 7, wherein recycle solution is a portion of the product ammonium salt solution, to produce a gas phase and an ammonium salt solution;
  (b) separating the gas phase from the solution;
  (c) feeding the solution from step (b) to an evaporator, to provide a gas phase and a concentrated ammonium salt solution;
  (d) feeding the concentrated ammonium salt solution to a steam stripper to remove residual hydrogen sulfide, water and hydrocarbons, if present, wherein steam provides driving force to remove said hydrogen sulfide, water and hydrocarbons from said concentrated salt solution to provide a purified concentrated ammonium salt solution and a gas component; and
  (e) contacting the purified ammonium salt solution exiting the stripper with a base to provide an ammonium salt solution having a pH between 6 and 8.

3. A process for removing ammonia from an acid gas comprising ammonia and hydrogen sulfide comprising:
  (a) contacting the acid gas with a strong acid, selected from the group consisting of sulfuric acid, phosphoric acid and nitric acid and with recycle solution at a pH less than 7, wherein recycle solution is a portion of the product ammonium salt solution, to produce a gas phase and an ammonium salt solution;
  (b) separating the gas phase from the solution;
  (c) feeding the solution from step (b) to an evaporator, to provide a gas phase and a concentrated ammonium salt solution;
  (d) feeding the concentrated ammonium salt solution to a gas stripper to remove residual hydrogen sulfide, water and hydrocarbons, if present, wherein carrier gas provides driving force to remove said hydrogen sulfide, water and hydrocarbons from said concentrated salt solution to provide a purified concentrated ammonium salt solution and a gas component; and
  (e) contacting the purified ammonium salt solution exiting the stripper with a base to provide an ammonium salt solution having a pH between 6 and 8.

4. A process according to claim 1, 2, or 3 further comprising feeding the ammonium salt solution having a pH between 6 and 8 to a crystallizer to produce a solid ammonium salt product.

5. A process according to claim 1, 2, or 3 wherein the strong acid is sulfuric acid.

6. A process according to claim 1, 2, or 3 wherein the strong acid is phosphoric acid.

7. A process according to claim 1, 2, or 3 wherein the strong acid is nitric acid.

8. A process according to claim 1, 2, or 3 wherein the base is ammonia or ammonium hydroxide.

9. A process according to claim 1, 2, or 3 wherein the base is potassium hydroxide.

10. A process according to claim 1, 2, or 3 wherein the ammonium salt solution produced in step (a) has a pH of 2 to 4.

11. A process according to claim 1, 2, or 3 wherein the gas phase produced in step (b) is further processed in a sulfur recovery unit furnace or in a spent acid recovery furnace.

12. A process according to claim 1 further comprising condensing the gas component produced in step (c) to provide a liquid comprising hydrogen sulfide and feeding the liquid to a sour water storage tank or a spent acid recovery furnace for further processing.

13. A process according to claim 2 or 3 further comprising condensing the gas component produced in step (d) to provide a liquid comprising hydrogen sulfide and feeding the liquid to a sour water storage tank or a spent acid recovery furnace for further processing.

14. A process according to claim 3 further comprising feeding the gas component produced in step (d) to a sulfur recovery unit furnace or a spent acid recovery furnace for further processing.

15. A process according to claim 3 wherein the carrier gas is air or nitrogen.

16. A process according to claim 15 wherein the carrier gas is air.

* * * * *